(12) United States Patent
Sturgin (10) Patent No.: US 9,115,768 B2
(45) Date of Patent: Aug. 25, 2015

(54) SWITCHABLE BI-DIRECTIONAL WEDGE CLUTCH (71) Applicant: Schaeffler Technologies AG & Co. KG, Herzogenaurach (DE)

(72) Inventor: Todd J. Sturgin, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 5 days.

(21) Appl. No.: 14/049,565

(22) Filed: Oct. 9, 2013

(65) Prior Publication Data

US 2014/0291099 A1 Oct. 2, 2014

Related U.S. Application Data (60) Provisional application No. 61/805,345, filed on Mar. 26, 2013.

(51) Int. Cl.
*F16D 21/02* (2006.01)
*F16D 21/04* (2006.01)
*F16D 13/14* (2006.01)
*F16D 11/16* (2006.01)
*F16D 23/12* (2006.01)

(52) U.S. Cl.
CPC ............. *F16D 21/04* (2013.01); *F16D 13/14* (2013.01); *F16D 11/16* (2013.01); *F16D 2023/123* (2013.01); *F16D 2300/24* (2013.01)

(58) Field of Classification Search
CPC ....... F16D 21/04; F16D 13/14; F16D 11/116; F16D 2023/123; F16D 2300/24
USPC ......... 192/48.91, 48.5, 70.11, 48.6, 30 R, 31, 192/41 R, 43.1, 48.1, 200, 114 R, 38, 44, 47; 180/247, 248, 249, 251; 475/150, 204, 475/200, 201, 223, 225, 249
See application file for complete search history.

(56) References Cited

U.S. PATENT DOCUMENTS

| 4,186,827 | A | * | 2/1980 | Spanke | 192/18 A |
|---|---|---|---|---|---|
| 6,652,407 | B2 | | 11/2003 | Ronk et al. | |
| 7,168,545 | B2 | * | 1/2007 | Ochsenknecht et al. | 192/109 F |
| 8,272,488 | B2 | * | 9/2012 | Eisengruber et al. | 192/46 |
| 2002/0027055 | A1 | * | 3/2002 | Le-Calve et al. | 192/46 |
| 2013/0248317 | A1 | * | 9/2013 | Lee | 192/70.11 |

* cited by examiner

*Primary Examiner* — Ramya Burgess
*Assistant Examiner* — David J Hlavka
(74) *Attorney, Agent, or Firm* — Simpson & Simpson, PLLC (57) ABSTRACT A switchable clutch, including: a first outer race; a second outer race; an inner race; at least one wedge block at least partially radially located between the inner race and the first and second outer races; and a single actuator rod displaceable to position the at least one wedge block. In a first position for the actuation rod and the at least one wedge block, the first outer race and the inner race are non-rotatably connected. In a second position for the actuation rod and the at least one wedge block, the second outer race and the inner race are non-rotatably connected. In a third position for the actuation rod and the at least one wedge block, the inner race is rotatable with respect to the first and second outer races.

20 Claims, 9 Drawing Sheets

SWITCHABLE BI-DIRECTIONAL WEDGE CLUTCH

CROSS-REFERENCE TO RELATED APPLICATIONS

This application claims the benefit under 35 U.S.C. §119 (e) of U.S. Provisional Patent Application No. 61/805,345 filed Mar. 26, 2013, which application is incorporated herein by reference in its entirety.

TECHNICAL FIELD

The present disclosure relates to a switchable bi-directional clutch, in particular a clutch switchable between multiple torque paths using a single actuator and while maintaining rotation of components in the torque paths.

BACKGROUND

Known switchable clutches either use multiple actuators to control multiple torque paths and/or require cessation of rotation of components in torque paths being switched.

SUMMARY

According to aspects illustrated herein, there is provided a switchable clutch, including: a first outer race; a second outer race; an inner race; at least one wedge block at least partially radially located between the inner race and the first and second outer races; and an actuator rod displaceable to position the at least one wedge block. In a first axial position for the actuation rod and the at least one wedge block, the first outer race and the inner race are non-rotatably connected. In a second axial position for the actuation rod and the at least one wedge block, the second outer race and the inner race are non-rotatably connected. In a third axial position for the actuation rod and the at least one wedge block, the inner race is rotatable with respect to the first and second outer races.

According to aspects illustrated herein, there is provided a switchable clutch, including: a first outer race; a second outer race; a hub assembly including an inner race and at least one wedge block; a first wedge plate radially disposed between the first outer race and the inner race; a second wedge plate radially disposed between the second outer race and the inner race; and one only actuation rod. The one only actuation rod is axially displaceable such that: in a first axial position for the one only actuation rod, the first outer race, the first wedge plate, and the inner race are non-rotatably connected; in a second axial position for the one only actuation rod, the second outer race, the second wedge plate, and the inner race are non-rotatably connected; and in a third axial position for the one only actuation rod, the inner race is rotatable with respect to the first and second outer races.

According to aspects illustrated herein, there is provided a switchable clutch, including: a drive shaft; a first outer race; a second outer race; a hub assembly including an inner race non-rotatably connected to the drive shaft and a plurality of wedge blocks non-rotatably engaged with the inner race, each wedge block including respective first and second axial ends; a first wedge plate radially disposed between the first outer race and the inner race; a second wedge plate radially disposed between the second outer race and the inner race; and a single actuator rod. The single actuation rod is axially displaceable such that in a first position for the single actuation rod and the plurality of wedge blocks: the respective first axial ends are circumferentially aligned with the first wedge plate; the respective second axial ends are non-rotatably engaged with the second wedge plate; and the first outer race, the first wedge plate, and the inner race are non-rotatably connected. The single actuation rod is axially displaceable such that in a second position for the single actuation rod and the plurality of wedge blocks: the respective second axial ends are circumferentially aligned with the second wedge plate; the respective first axial ends are non-rotatably engaged with the first wedge plate; and the second outer race, the second wedge plate, and the inner race are non-rotatably connected. The single actuation rod is axially displaceable such that in a third position for the single actuation rod and the plurality of wedge blocks: the respective first axial ends are circumferentially aligned with the first wedge plate; the respective second axial ends are circumferentially aligned with the second wedge plate; and the inner race is rotatable with respect to the first and second outer races.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
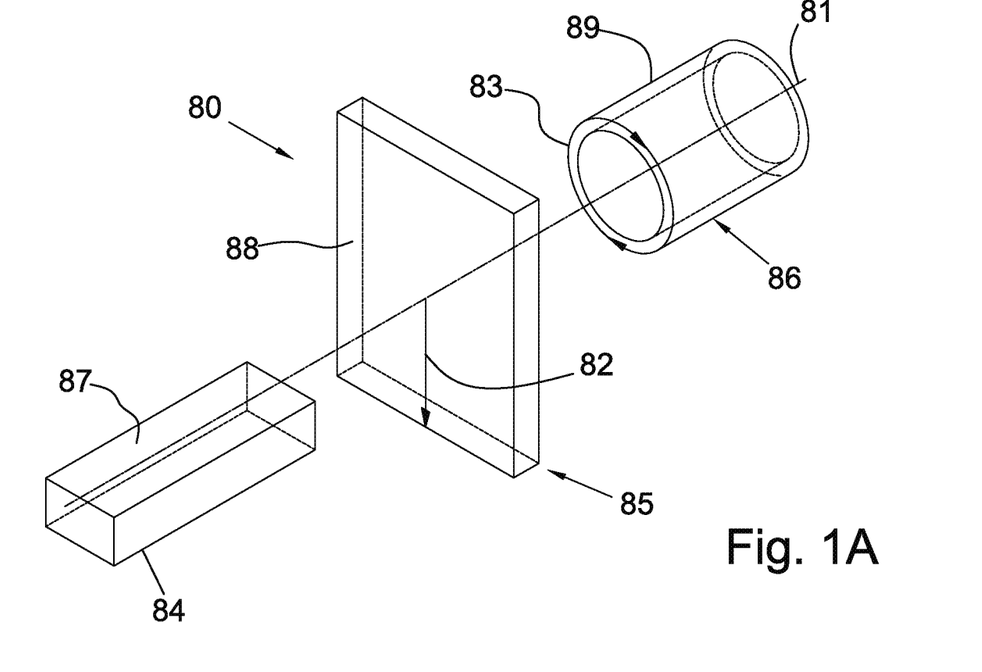
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
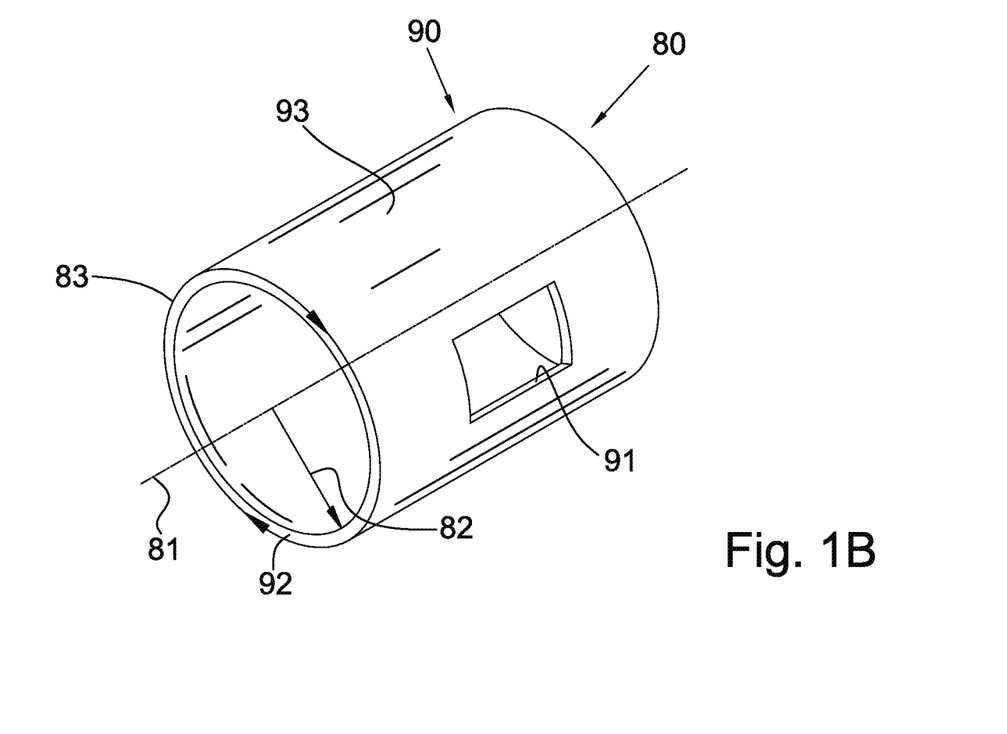
FIG. 1B is a perspective view of an object in the cylindrical coordinate system of FIG. 1A demonstrating spatial terminology used in the present application; and, FIG. 2 is a perspective view of a switchable clutch.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
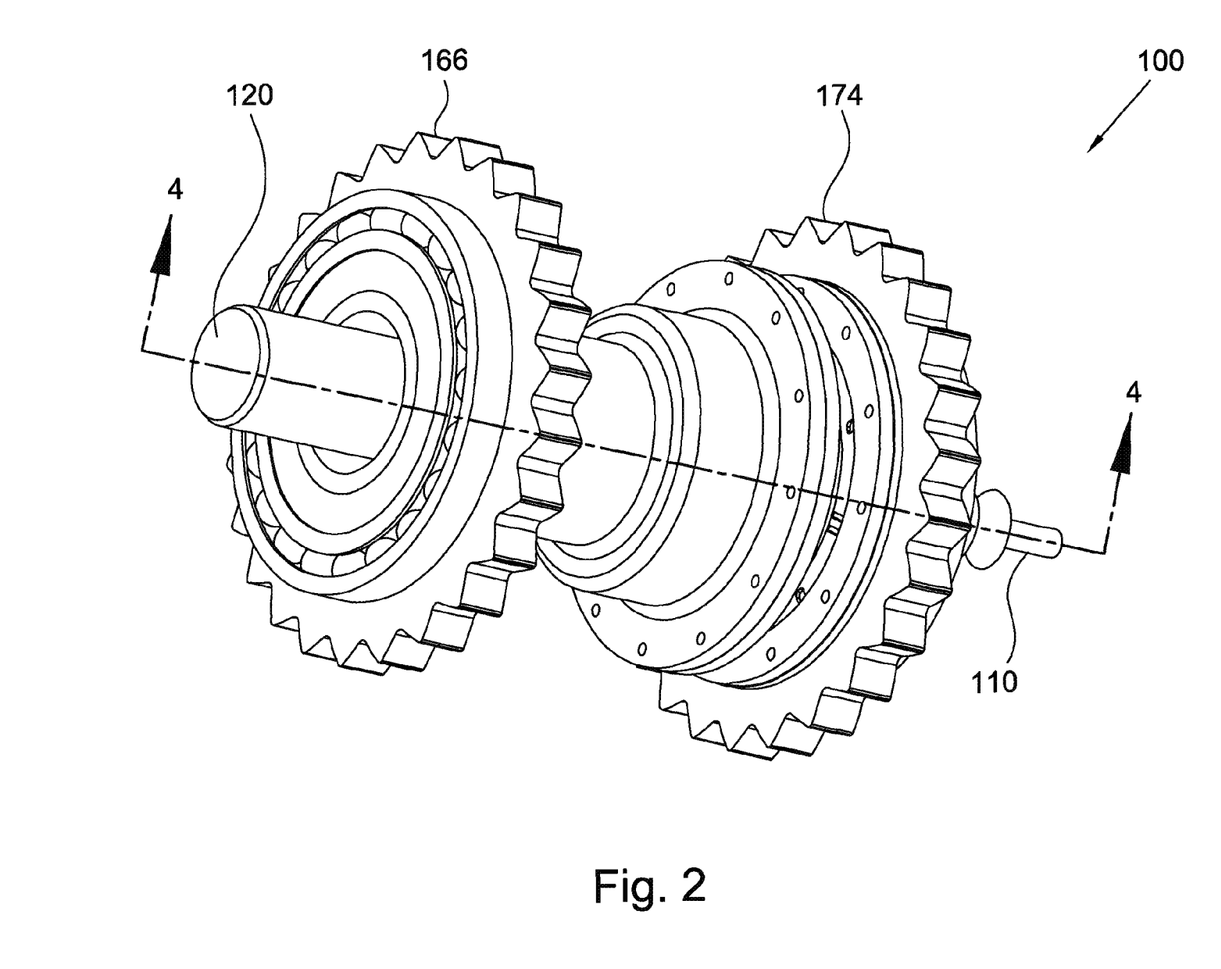

FIG. 2 is a perspective view of switchable clutch 100.

Figure 3:
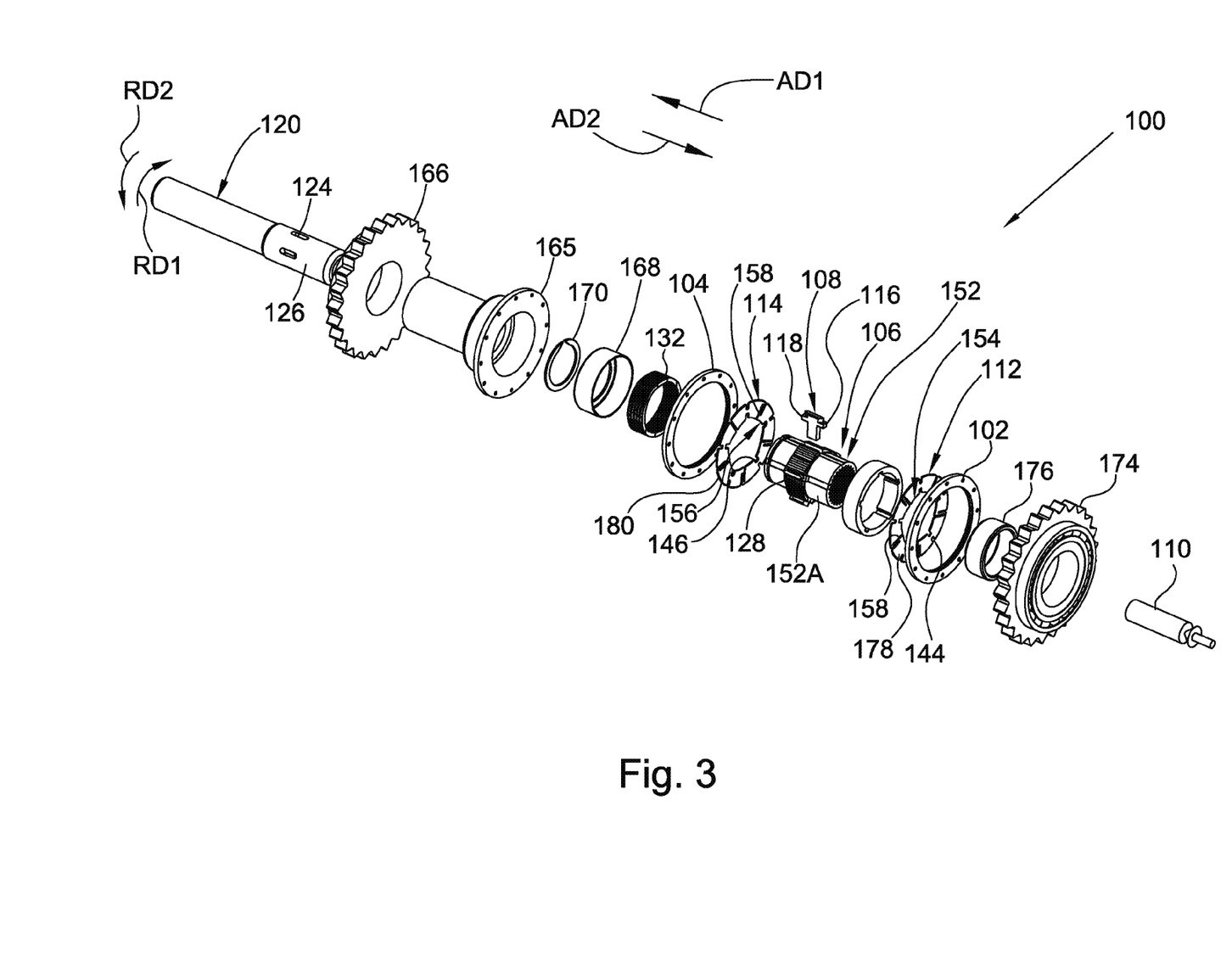
FIG. 3 is an exploded view of the switchable clutch of FIG. 2.

FIG. 3 is an exploded view of switchable clutch 100 of FIG. 2.

Figure 4:
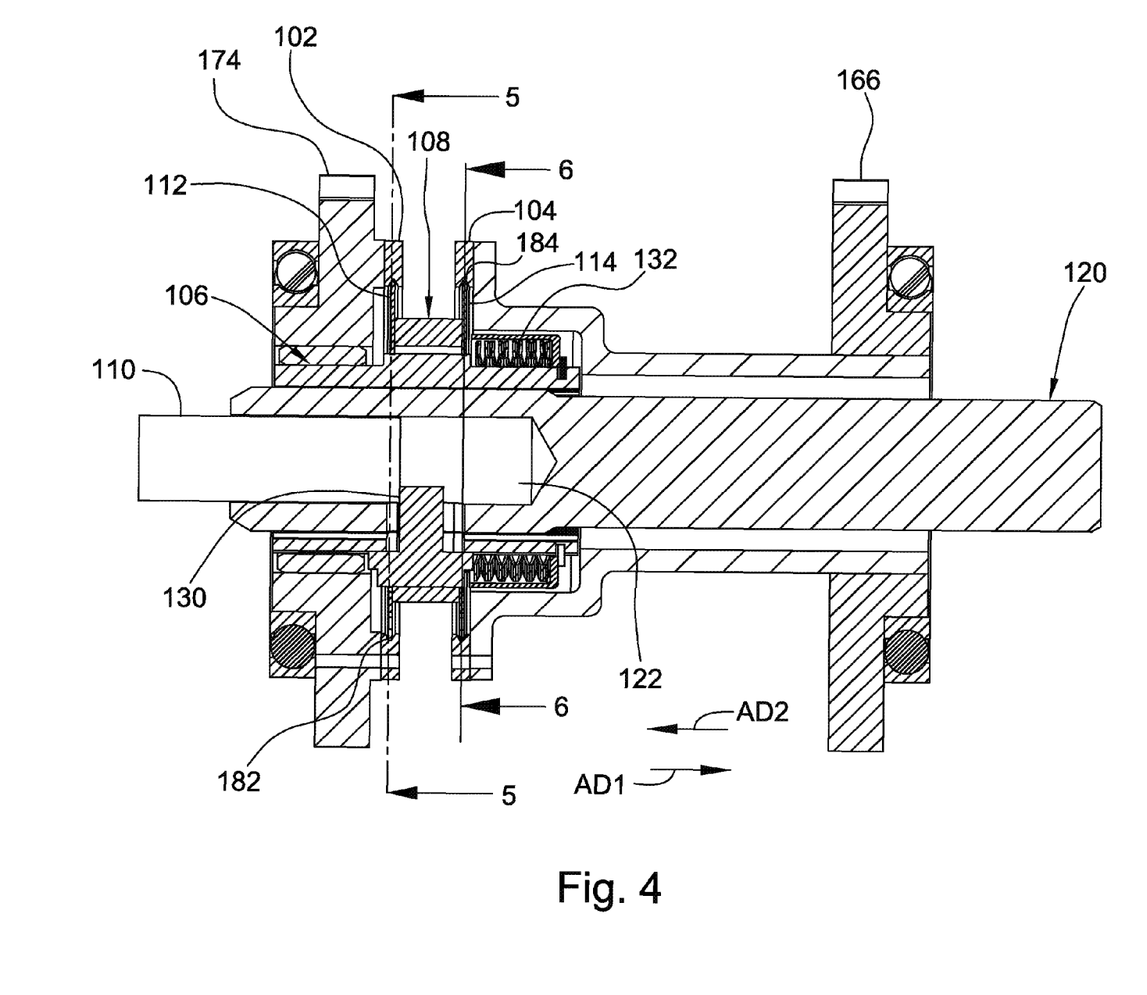
FIG. 4 is a cross-sectional view generally along line 4-4 in FIG. 2.

FIG. 4 is a cross-sectional view generally along line 4-4 in FIG. 2.

Figure 5:
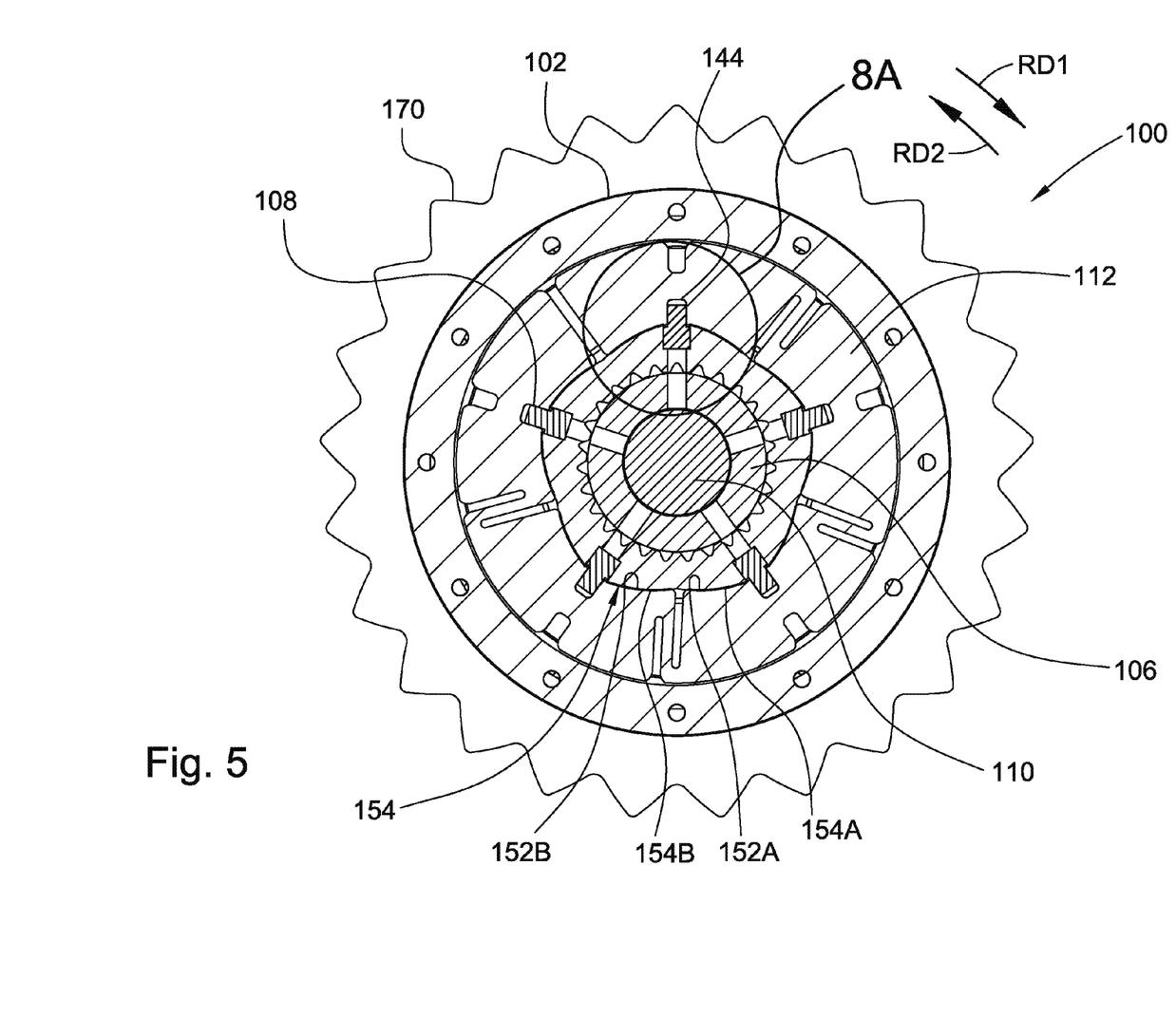
FIG. 5 is a cross-sectional view generally along line 5-5 in FIG. 4.

FIG. 5 is a cross-sectional view generally along line 5-5 in FIG. 4.

Figure 6:
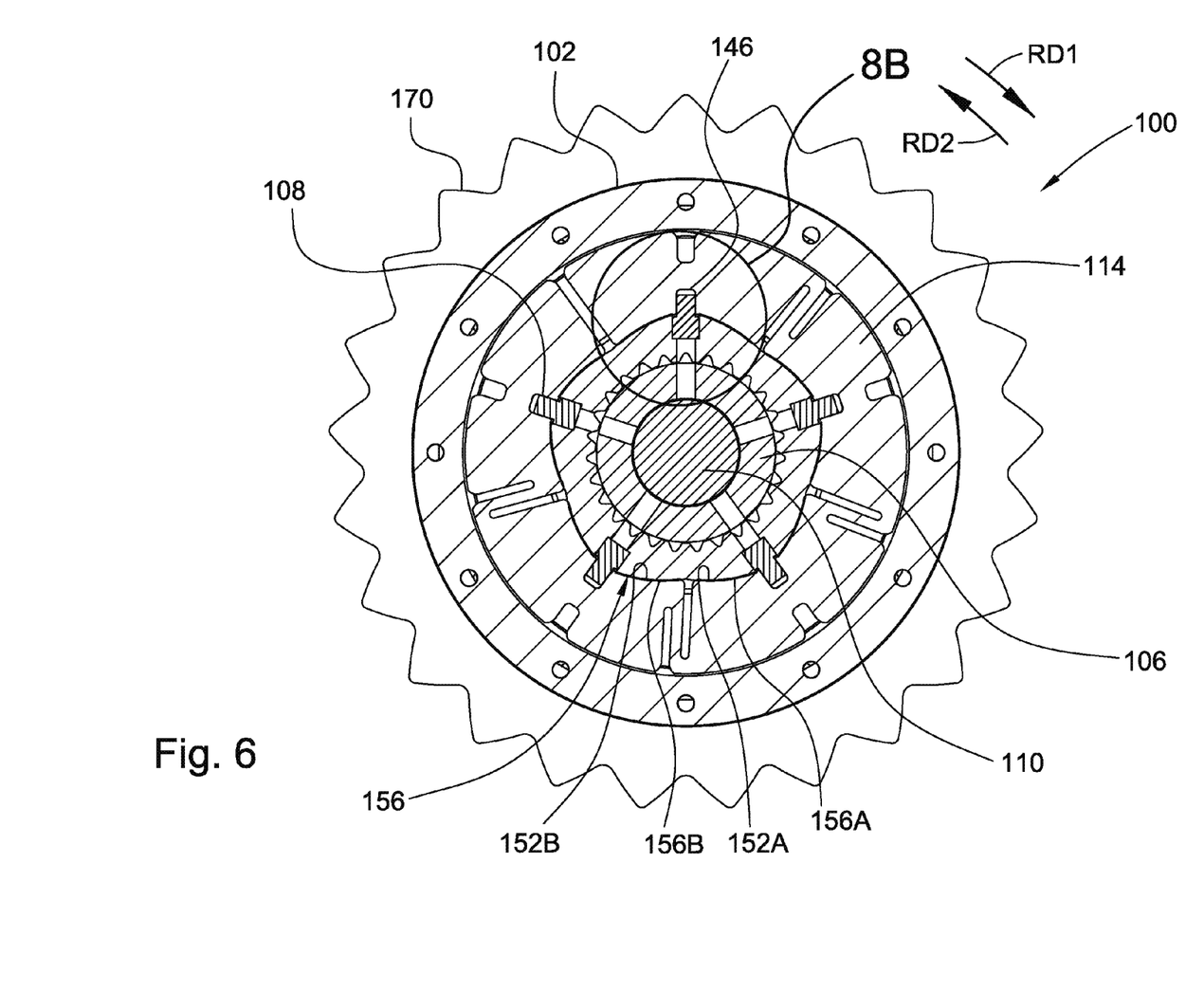
FIG. 6 is a cross-sectional view generally along line 6-6 in FIG. 4.

FIG. 6 is a cross-sectional view generally along line 6-6 in FIG. 4.

Figure 7A:
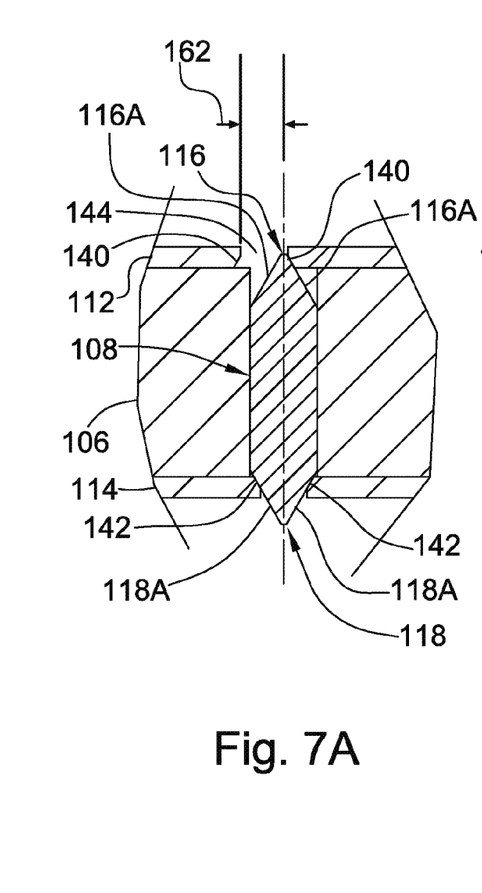
FIGS. 7A through 7C are respective top views of a wedge block in FIG. 2.
Figure 7B:
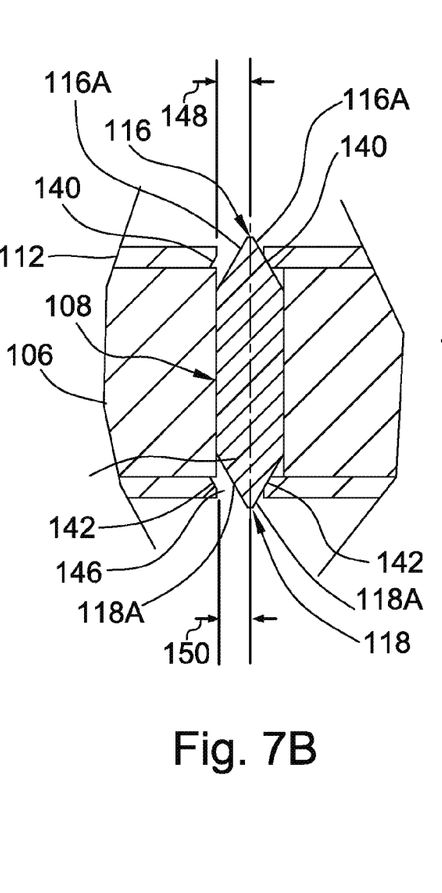
Figure 7C:
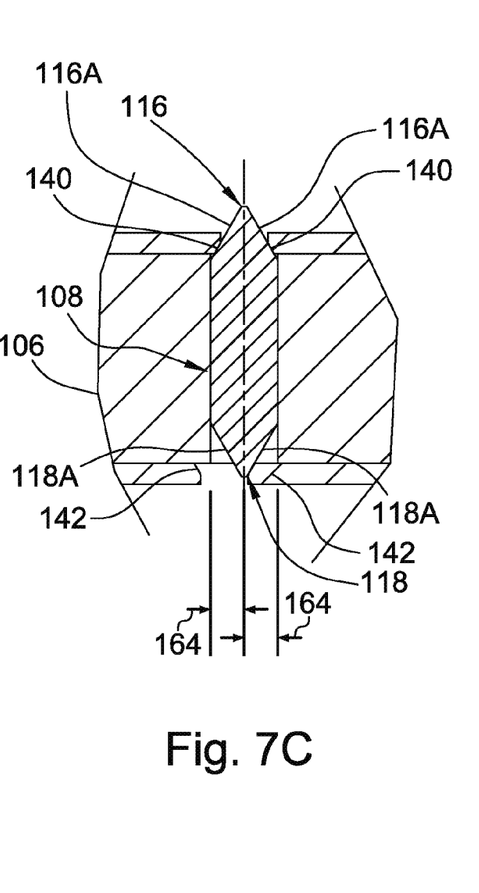

FIGS. 7A through 7C are respective top views of a wedge block in FIG. 2. The following should be viewed in light of FIGS. 2 through 7C. Switchable clutch 100 includes outer race 102, outer race 104, inner race 106, at least one wedge block 108, and actuator rod 110. Block 108 is at least partially radially located between the inner race and the outer races. In an example embodiment, clutch 100 includes only one single actuator rod 110. The actuator rod is axially displaceable, for example, in opposite directions AD1 and AD2, to contact, displace, and position the at least one wedge block. In an example embodiment, the at least one block 108 includes a plurality of blocks 108. The discussion that follows assumes a plurality of blocks 108; however, it should be understood that clutch 100 is not limited to a plurality of blocks 108.

In a first position for the actuation rod and blocks 108 (a first mode of operation for clutch 100), as shown in FIG. 7A and further described below, outer race 102 and inner race 106 are non-rotatably connected. In a second position for the actuation rod and blocks 108 (a second mode of operation for clutch 100), as shown in FIG. 7C and further described below, outer race 104 and inner race 106 are non-rotatably connected. In a third position for the actuation rod and blocks 108 (a third mode of operation for clutch 100), as shown in FIG. 7B and further described below, the inner race is rotatable with respect to outer races 102 and 104. In the first position noted above, the inner race is rotatable with respect to outer race 104. In the second position noted above, the inner race is rotatable with respect to outer race 102.

Advantageously, torque can continue to be applied to clutch 100 during respective transitions between the three positions noted above. For example, at least one of inner race 106 or outer race 102 is arranged to continuously rotate, in response to torque applied to the inner race or race 102, when switching from the first position noted above to the second position noted above. For example, if the clutch is in the first mode of operation and torque applied to outer race 102 is being transmitted to the inner race, when switching to the second mode of operation in which torque is to be applied to outer race 104 for transmission to the inner race, the inner race can continue to rotate during the transition to the second mode. For example, in like manner, at least one of inner race 106 or outer race 104 is arranged to continuously rotate, in response to torque applied to the inner race or race 104, when switching from the second position noted above to the first position noted above. For example, if the clutch is in the second mode of operation and torque applied to inner race 106 is being transmitted to outer race 104, when switching to the first mode of operation in which the torque applied to inner race 106 is to be transmitted to outer race 102, the inner race can continue to rotate during the transition to the first mode.

As part of the continuous operation of clutch 100, to switch from the first position noted above to the second position noted above, actuation rod 110 is arranged to pass through the third position noted above. As part of the continuous operation of clutch 100, to switch from the second position noted above to the first position noted above, actuation rod 110 is arranged to pass through the third position noted above.

Clutch 100 includes wedge plate 112 radially disposed between outer race 102 and the inner race, and wedge plate 114 radially disposed between outer race 104 and the inner race. In the first position noted above, outer race 102, wedge plate 112, and the inner race are non-rotatably connected. In the second position noted above, outer race 104, the wedge plate 114, and the inner race are non-rotatably connected. In the third position noted above, the inner race is non-rotatably connected to wedge plates 112 and 114. In the first position noted above, the inner race is non-rotatably connected to wedge plate 114. In the second position noted above, the inner race is non-rotatably connected to wedge plate 112.

In an example embodiment, each block 108 includes axial ends 116 and 118 and is non-rotatably engaged with the inner race. To initiate the first position noted above (see FIG. 7A), the actuation rod is arranged to position blocks 108 such that wedge plate 114 is non-rotatably connected to axial ends 118, wedge plate 112 is rotatable with respect to axial end 116, and wedge plate 112 non-rotatably engages outer race 102 and the inner race. To initiate the second position noted above (see FIG. 7C), the actuation rod is arranged to position blocks 108 such that wedge plate 112 is non-rotatably connected to axial ends 116, wedge plate 114 is rotatable with respect to axial end 118, and wedge plate 114 non-rotatably engages outer race 104 and the inner race.

In an example embodiment, clutch 100 includes drive shaft 120 with hollow portion, or space, 122, and a plurality of slots 124 connecting radially outward surface 126 of the drive shaft to the hollow portion. The inner race is non-rotatably connected to the drive shaft and includes a plurality of slots 128 radially aligned with slots 124. Each block 108 is disposed in a pair of respective slots 124 and 128 such that portion 130 of the block is disposed in the hollow portion and axial ends 116 and 118 are radially outward of the inner race. The hub assembly includes at least one spring 132 located in the hollow portion, engaged with portions 130, and urging blocks 108 in a axial direction AD2. The discussion that follows assumes a single spring 132; however it should be understood that clutch 100 is not limited to a single spring 132. The actuating rod is at least partially disposed in the hollow portion and is engaged with portions 130.

In an example embodiment, to switch from the first position noted above to the third position noted above, or to switch from the third position noted above to the second position noted above, the actuating rod is arranged to displace blocks 108 in axial direction AD1 against the urging spring 132. In an example embodiment, to switch from the second position noted above to the third position noted above, or to switch from the third position noted above to the first position noted above the actuating rod is arranged to displace in axial direction AD2 and spring 132 is arranged to displace the plurality of wedge blocks in axial direction AD2.

Clutch 100 is bi-directional. In an example embodiment, the drive shaft is arranged to receive torque and the inner race, via the non-rotatable connection to the drive shaft, is arranged to transmit the torque to outer race 102 or 104 for the first or second position, respectively, noted above. In an example embodiment, outer race 102 or 104 is arranged to receive torque and is arranged to transmit the torque to the inner race and the drive shaft for the first or second position, respectively, noted above.

In FIGS. 7A through 7C intervening components have been removed to expose the components shown in FIGS. 7A through 7C. In an example embodiment as shown in FIG. 7B, wedge plates 112 and 114 include engagement surfaces 140 and 142, respectively; end 116 includes surfaces 116A; and end 118 includes surfaces 118A. Axial ends 116 and 118 of blocks 108 are circumferentially aligned with wedge plates 112 and 114, respectively, and at least partially disposed in indents 144 and 146 of wedge plates 112 and 114, respectively. Circumferential gap, or lash, 148 is present between ends 116 and plate 112. Circumferential gap, or lash, 150 is present between ends 118 and plate 114. Relative rotation between wedge plates 112 and 114 and the inner race in direction RD1 or RD2 is possible, but is not enough to non-rotatably connect the inner race to either of the outer races, as further described below. Thus, outer races 102 and 104 are rotatable with respect to the inner race. Note that gap 148 can be split between end 116 and each of surfaces 140 or can be between end 116 and only one of surfaces 140. Note that gap 150 can be split between end 118 and each of surfaces 142 or can be between end 118 and only one of surfaces 142. Due to the freedom of rotation inherent in the third position noted above, clutch 100 is able to switch between the first and second positions noted above without interrupting rotation of the outer races and/or inner races.

Figure 8A:
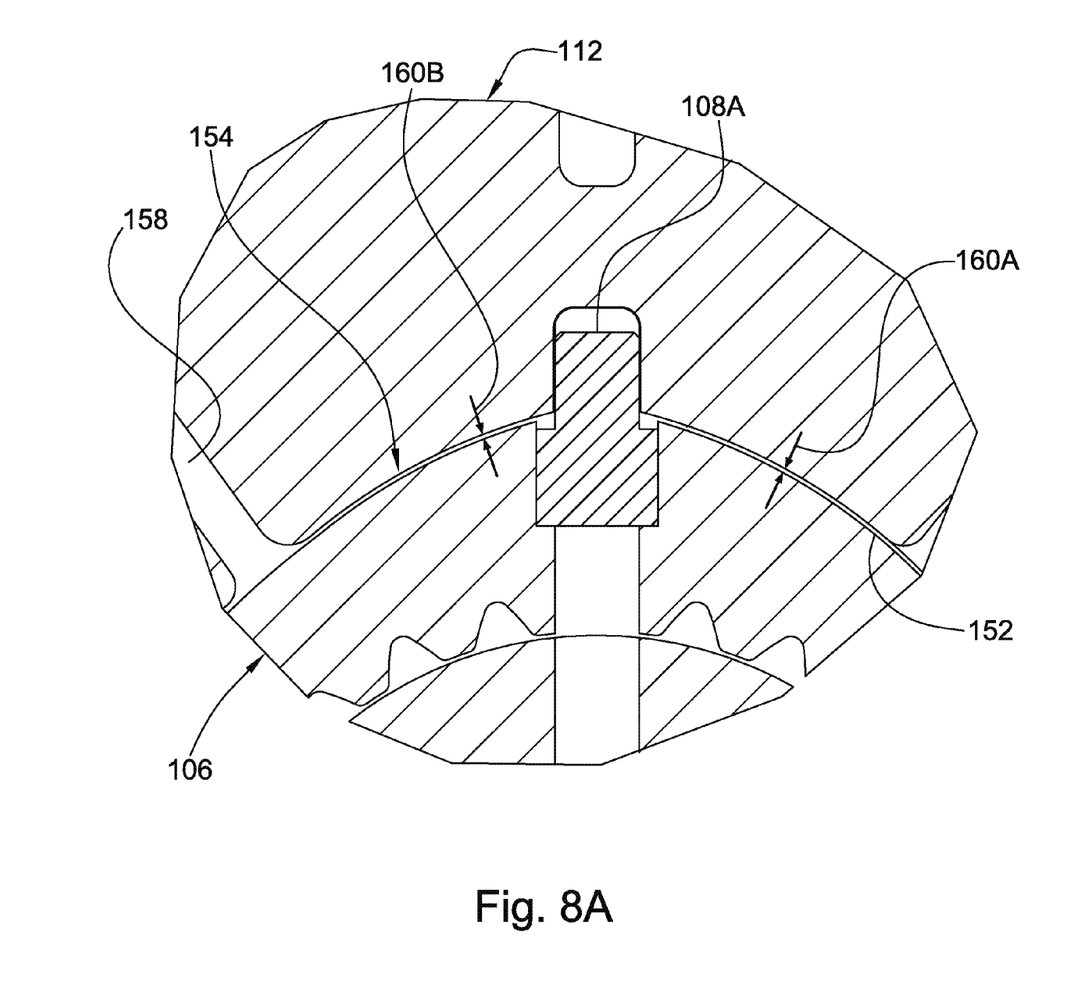
FIGS. 8A and 8B are details of areas 8A and 8B in FIGS. 5 and 6, respectively.
Figure 8B:
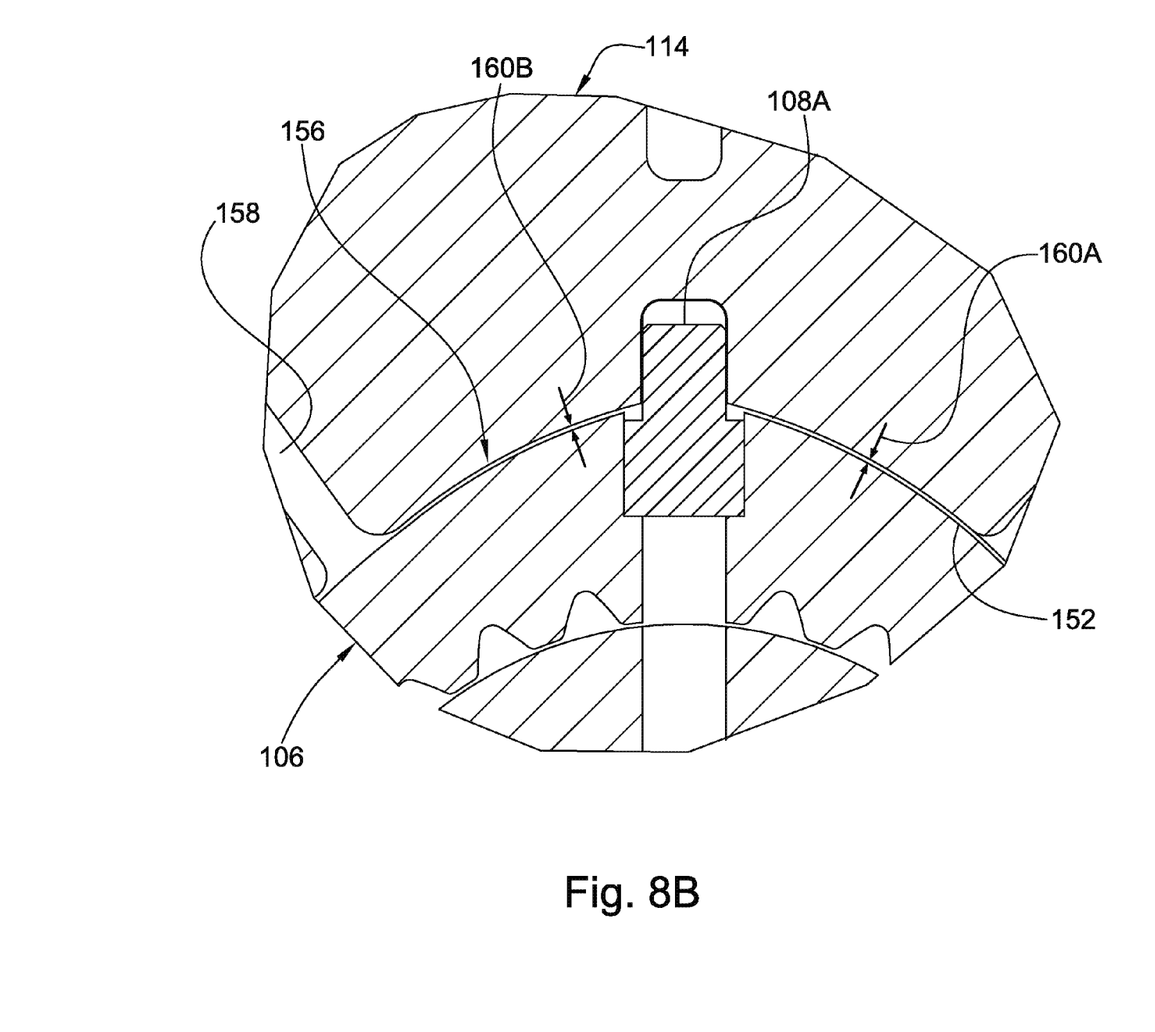

FIGS. 8A and 8B are details of areas 8A and 8B in FIGS. 5 and 6, respectively. The following should be viewed in light of FIG. 2 through 8B. Axial ends 116 and 118 include surfaces 116A and 118A, respectively, tapering to respective points. The inner race and plate 112 include outer circumferential surface 152 and inner circumferential surface 154, respectively. Plate 114 includes inner circumferential surface 156. Plates 112 and 114 also include slots 158. Ramps 152A and 152B of surface 152 are formed between circumferentially adjacent blocks 108. Ramps 154A and 154B of surface 154 are formed between circumferentially adjacent slots 144. In the figures, one grouping of ramps 152A/B and 154A/B is shown; however, it should be understood that the grouping is applicable to the remainder of surfaces 152 and 154. Ramps 156A and 156B of surface 156 are formed between adjacent slots 146. In the figures, one grouping of ramps 152A/B and 156A/B is shown; however, it should be understood that the grouping is applicable to the remainder of surfaces 152 and 156. As an example, in direction RD1, ramps 152A/154A/156A slope radially inward and ramps 152B/154B/156B slope radially outward. Gaps 160A and 160B are formed between respective ramps 152A/154A and 154A/154A and respective ramps 152B/156B and 154B/156B.

In the example of FIG. 7B, the relative rotation of plate 112 and the inner race (due to lash 148) is not enough to close gap 160A or 160B. Therefore, ramps 154A and 154B do not contact and slide up ramps 152A and 152B, respectively, the inner race does not apply a radially outward force to surfaces 154A/13 to urge plate 112 radially outward to non-rotatably engage with outer race 102, and plate 112 rotates with respect to the inner race. In like manner, ramps 156A and 156B do not contact and slide up ramps 152A and 152B, respectively, the inner race does not apply a radially outward force to surfaces 156A/B to urge plate 114 radially outward to non-rotatably engage with outer race 104, and plate 114 rotates with respect to the inner race.

In an example embodiment as shown in FIG. 7A, axial ends 116 and 118 of blocks 108 are circumferentially aligned with wedge plates 112 and 114, respectively, and at least partially disposed in indents 144 and 146 of wedge plates 112 and 114, respectively. Circumferential gap, or lash, 162 is present between ends 116 and plate 112. Due to the magnitude of gap 162, relative rotation of plate 112 and the inner race is enough to close gap 160A or 160B. Therefore, ramps 154A or 154B contact and slide up ramps 152A or 152B, respectively, the inner race applies a radially outward force to surfaces 154A/B to urge plate 112 radially outward to non-rotatably engage with outer race 102, and plate 112 is non-rotatably connected to the inner race. Note that gap 162 can be split between end 116 and each of surfaces 140 or can be between end 116 and only one of surfaces 140.

Surfaces 118A are in contact with surfaces 142 rotationally locking the inner race to wedge plate 114. As a result, relative rotation of wedge plate 114 and the inner race is prevented and the inner race and outer race 104 are rotatable with respect to each other.

In an example embodiment as shown in FIG. 7C, axial ends 116 and 118 of blocks 108 are circumferentially aligned with wedge plates 112 and 114, respectively, and at least partially disposed in indents 144 and 146 of wedge plates 112 and 114, respectively. Circumferential gap, or lash, 164 is present between ends 118 and plate 114. Due to the magnitude of gap 164, relative rotation of plate 114 and the inner race is enough to close gap 160A or 160B. Therefore, ramps 156A or 156B contact and slide up ramps 152A or 152B, respectively, the inner race applies a radially outward force to surfaces 156A/B to urge plate 114 radially outward to non-rotatably engage with outer race 104, and plate 114 is non-rotatably connected to the inner race. Note that gap 164 can be split between end 118 and each of surfaces 142 or can be between end 118 and only one of surfaces 142.

Surfaces 116A are in contact with surfaces 140 rotationally locking the inner race to wedge plate 112. As a result, relative rotation of wedge plate 112 and the inner race is prevented and the inner race and outer race 102 are rotatable with respect to each other.

The tapering of surfaces 116A and 118A enables the differences between gaps/lash. 148, 150, 152, and 164, which in turn enables the combinations of non-rotatable connecting and relative rotation described above. That is, the axial position of ends 116 and 118 with respect to wedge plates 112 and 114 (and indents 144 and 146), respectively, determine the operations of the inner race with respect to outer races 102 and 104. For example, in FIG. 7C, because end 116 extends further into indent 144 than end 118 extends into indent 146, end 116 is non-rotatably connected to plate 112, wedge plate 114 is rotatable with respect to the inner race, outer race 102 is rotatable with respect to the inner race, and outer race 104 is non-rotatably connected to the inner race.

The tapering of surfaces 116A and 118A also helps displace the wedge blocks when the clutch is under torque. The respective tapers gradually push the respective wedge plate away from the engaged position when the wedge blocks are pushed towards the respective wedge plates, for example, shifting surface 116A from the position in FIG. 7A to the position in FIG. 7C. A respective nominal axial force from spring 132 or shaft 110 results in a larger respective torsional force due to the ramp configuration of surfaces 116A and 118A. Surfaces 116A and 118A also help accommodate misalignment between slots 144 and 146 and the wedge plate and keep one side tight (rotationally lock the inner race with one of the wedge plates) while the other side has lash (the other wedge plate is rotatable with respect to the inner race).

In FIGS. 7A-7C, specific configurations of gaps/lash 148, 150, 152, and 164 are shown. However, it should be understood that other configurations are possible.

In an example embodiment clutch 100 includes the following components and/or configurations. Outer race 104 is fixedly connected to drive hub 165, which in turn is fixedly connected to gear/pulley 166. Spring 132 is at least partially disposed in spring cup 168 located within the drive hub and is axially retained by snap ring 170. Retaining ring 172 is radially disposed about at least a portion of the inner clutch and outer race 102 and is fixedly connected to gear/pulley 174. Bushing 176 enables relative rotation between gear/pulley 174 and the inner race. Outer circumferences 178 and 180 of wedge plates 112 and 114, respectively, are located in grooves 182 and 184 in outer races 102 and 104, respectively.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A switchable clutch, comprising:
a first outer race;
a second outer race;
an inner race;
at least one wedge block at least partially radially located between the inner race and the first and second outer races; and,
an actuator rod displaceable to position the at least one wedge block, wherein:
in a first axial position for the actuation rod and the at least one wedge block, the first outer race and the inner race are non-rotatably connected;
in a second axial position for the actuation rod and the at least one wedge block, the second outer race and the inner race are non-rotatably connected; and,
in a third axial position for the actuation rod and the at least one wedge block, the inner race is rotatable with respect to the first and second outer races.

2. The switchable clutch of claim 1, wherein:
at least one of the inner race or the first outer race is arranged to continuously rotate when the actuator rod switches from the first axial position to the second axial position; or,
at least one of the inner race or the second outer race is arranged to continuously rotate when the actuator rod switches from the second axial position to the first axial position.

3. The switchable clutch of claim 1, further comprising:
a first wedge plate radially disposed between the first outer race and the inner race; and,
a second wedge plate radially disposed between the second outer race and the inner race, wherein:
when the actuation rod and the at least one wedge block are in the first axial position, the first outer race, the first wedge plate, and the inner race are non-rotatably connected;
when the actuation rod and the at least one wedge block are in the second axial position, the second outer race, the second wedge plate, and the inner race are non-rotatably connected; and,
when the actuation rod and the at least one wedge block are in the third axial position, the inner race is non-rotatably connected to the first and second wedge plates.

4. The switchable clutch of claim 1, wherein:
to switch from the first axial position to the second axial position, the actuation rod is arranged to pass through the third axial position; and,
to switch from the second axial position to the first axial position, the actuation rod is arranged to pass through the third axial position.

5. A switchable clutch, comprising:
a first outer race;
a second outer race;
a hub assembly including:
an inner race; and,
at least one wedge block;
a first wedge plate radially disposed between the first outer race and the inner race;
a second wedge plate radially disposed between the second outer race and the inner race; and,
one only actuation rod, wherein:
the one only actuation rod is axially displaceable such that:
in a first axial position for the one only actuation rod, the first outer race, the first wedge plate, and the inner race are non-rotatably connected;
in a second axial position for the one only actuation rod, the second outer race, the second wedge plate, and the inner race are non-rotatably connected; and,
in a third axial position for the one only actuation rod, the inner race is rotatable with respect to the first and second outer races.

6. The switchable clutch of claim 5, wherein:
when the one only actuation rod is in the first axial position, the inner race is rotatable with respect to the second outer race; and,
when the one only actuation rod is in the second axial position, the inner race is rotatable with respect to the first outer race.

7. The switchable clutch of claim 5, wherein:
when the one only actuation rod is in the first axial position, the inner race is non-rotatably connected to the second wedge plate; and,
when the one only actuation rod is in the second axial position, the inner race is non-rotatably connected to the first wedge plate.

8. The switchable clutch of claim 5, wherein at least one of the inner race or the first outer race is arranged to continuously rotate when the one only actuator rod switches from the first axial position to the second axial position.

9. The switchable clutch of claim 5, wherein at least one of the inner race or the second outer race is arranged to continuously rotate when the one only actuator rod switches from the second axial position to the first axial position.

10. The switchable clutch of claim 5, wherein:
the at least one wedge block includes first and second axial ends;
the at least one wedge block is non-rotatably engaged with the inner race; and,
to attain the first axial position for the one only actuation rod, the one only actuation rod is arranged axially displace the at least one wedge block such that:
the second wedge plate is non-rotatably connected to the second axial end;
the first wedge plate is rotatable with respect to the first axial end; and,
the first wedge plate non-rotatably engages the first outer race and the inner race.

11. The switchable clutch of claim 5, wherein:
the at least one wedge block includes first and second axial ends;
the at least one wedge block is non-rotatably engaged with the inner race;
to attain the second axial position for the one only actuation rod, the one only actuation rod is arranged to axially displace the at least one wedge block such that:
the second wedge plate is non-rotatably connected to the second axial end;
the first wedge plate rotates with respect to the first axial end; and,
the first wedge plate non-rotatably engages the first outer race and the inner race.

12. The switchable clutch of claim 5, further comprising a drive shaft with a hollow portion and a first plurality of slots connecting a radially outward surface of the drive shaft to the hollow portion, wherein:
the inner race is non-rotatably connected to the drive shaft and includes a second plurality of slots radially aligned with the first plurality of slots;
the at least one wedge block includes a plurality of wedge blocks;
a respective first portion of each wedge block in the plurality of wedge blocks is disposed in a respective slot from the first and second pluralities of slots;
the first and second axial ends are radially outward of the inner race;
the hub assembly includes at least one spring located in the hollow portion, engaged with the respective first portions of the plurality of wedge blocks, and urging the plurality of wedge blocks in a first axial direction; and,
the one only actuating rod is at least partially disposed in the hollow portion and is engaged with the first portions of the wedge blocks.

13. The switchable clutch of claim 12, wherein to switch from the first axial position of the one only actuating rod to the third axial position of the one only actuation rod or to switch from the third axial position of the one only actuating rod to the second axial position of the one only actuating rod, the one only actuating rod is arranged to displace the plurality of wedge blocks in a second axial direction, opposite the first axial direction, against the urging of the at least one spring.

14. The switchable clutch of claim 12, wherein to switch from the second axial position of the one only actuating rod to the third axial position of the one only actuation rod or to switch from the third axial position of the one only actuating rod to the first axial position of the one only actuating rod: the one only actuating rod is arranged to displace in the first axial direction; and,
the at least one spring is arranged to displace the plurality of wedge blocks in the first axial direction.

15. The switchable clutch of claim 5, further comprising a drive shaft, wherein:
the inner race is non-rotatably connected to the drive shaft;
the drive shaft is arranged to receive torque; and,
the inner race is arranged to transmit the torque to the first or second outer race when the one only actuation rod is in the first or second axial position, respectively.

16. The switchable clutch of claim 5, further comprising a shaft, wherein:
the inner race is non-rotatably connected to the drive shaft;
the first or second outer race is arranged to receive torque; and,
the first or second outer race is arranged to transmit the torque to the inner race when the one only actuation rod is in the first or second axial position, respectively.

17. A switchable clutch, comprising:
a drive shaft;
a first outer race;
a second outer race;
a hub assembly including:
an inner race non-rotatably connected to the drive shaft; and,
a plurality of wedge blocks non-rotatably engaged with the inner race, each wedge block including respective first and second axial ends;
a first wedge plate radially disposed between the first outer race and the inner race;
a second wedge plate radially disposed between the second outer race and the inner race; and, wherein:
a single actuator rod, wherein:
the single actuation rod is axially displaceable such that:
in a first position for the single actuation rod and the plurality of wedge blocks:
the respective first axial ends are circumferentially aligned with the first wedge plate;
the respective second axial ends are non-rotatably engaged with the second wedge plate; and,
the first outer race, the first wedge plate, and the inner race are non-rotatably connected;
in a second position for the single actuation rod and the plurality of wedge blocks:
the respective second axial ends are circumferentially aligned with the second wedge plate;
the respective first axial ends are non-rotatably engaged with the first wedge plate; and,
the second outer race, the second wedge plate, and the inner race are non-rotatably connected; and,
in a third position for the single actuation rod and the plurality of wedge blocks:
the respective first axial ends are circumferentially aligned with the first wedge plate;
the respective second axial ends are circumferentially aligned with the second wedge plate; and,
the inner race is rotatable with respect to the first and second outer races.

18. The switchable clutch of claim 17, wherein:
in the first position for the single actuation rod and the plurality of wedge blocks, the inner race is rotatable with respect to the second outer race; and,
in the second position for the single actuation rod and the plurality of wedge blocks, the inner race is rotatable with respect to the first outer race.

19. The switchable clutch of claim 17, wherein:
at least one of the inner race or the first outer race is arranged to continuously rotate when switching from the first axial position for the single actuation rod to the second axial position for the single actuation rod; and,
at least one of the inner race or the second outer race is arranged to continuously rotate when switching from the second axial position for the single actuation rod to the first axial position for the single actuation rod.

20. The switchable clutch of claim 17, wherein:
the drive shaft is arranged to receive torque and transmit the torque to the first or second outer race; or
the first or second outer race is arranged to receive torque and transmit the torque to the drive shaft.

* * * * *